United States Patent
Chen et al.

(10) Patent No.: US 12,280,326 B2
(45) Date of Patent: Apr. 22, 2025

(54) SYSTEM FOR SEPARATION OF GAS AND SOLID

(71) Applicant: HIGHLIGHT TECH CORP., Tainan (TW)

(72) Inventors: Chien-Hsun Chen, Tainan (TW); Kuen-Yi Wu, Tainan (TW)

(73) Assignee: HIGHLIGHT TECH CORP., Tainan (TW)

( * ) Notice: Subject to any disclaimer, the term of this patent is extended or adjusted under 35 U.S.C. 154(b) by 795 days.

(21) Appl. No.: 17/477,590

(22) Filed: Sep. 17, 2021

(65) Prior Publication Data

US 2022/0088517 A1    Mar. 24, 2022

(30) Foreign Application Priority Data

Sep. 18, 2020 (TW) ................................. 109132288

(51) Int. Cl.
*B01D 45/12* (2006.01)
*B01D 47/06* (2006.01)

(52) U.S. Cl.
CPC ............. *B01D 45/12* (2013.01); *B01D 47/06* (2013.01); *B01D 2247/101* (2013.01)

(58) Field of Classification Search
CPC .. B01D 45/12; B01D 47/06; B01D 2247/101; B04C 9/00; B04C 5/14; B04C 5/24; B04C 11/00
See application file for complete search history.

(56) References Cited

U.S. PATENT DOCUMENTS

| | | | | | |
|---|---|---|---|---|---|
| 2,616,563 A | * | 11/1952 | Hebb | ........................ | B04C 5/12 210/512.1 |
| 3,513,642 A | * | 5/1970 | Cornett | ..................... | B04C 5/13 209/23 |
| 3,615,199 A | * | 10/1971 | Terrana | ................... | C01B 17/62 422/607 |
| 3,818,846 A | * | 6/1974 | Reese | ..................... | F23G 5/008 110/220 |
| 4,000,993 A | * | 1/1977 | Holl | ....................... | B01D 47/06 95/224 |

(Continued)

FOREIGN PATENT DOCUMENTS

| CN | 208364169 | 1/2019 |
|---|---|---|
| CN | 210584256 | 5/2020 |

(Continued)

*Primary Examiner* — Dung H Bui

(57) ABSTRACT

A system for separation of gas and solid at least comprises a cyclone trapping device and a negative pressure waste gas treatment device. The cyclone trapping device has a gas inlet and outlet chamber and a cyclone separation chamber communicating with each other, and the gas inlet and outlet chamber has a gas inlet tube communicating with a process waste gas source and a gas outlet tube communicating with the negative pressure waste gas treatment device. A process waste gas generated by the process waste gas source is introduced into the gas inlet and outlet chamber through the gas inlet tube to generate cyclones, thereby separating a portion of solid particles from the process waste gas, and transmitting the process waste gas to the negative pressure waste gas treatment device through the gas outlet tube in order to further separate the remaining solid particles from the process waste gas.

18 Claims, 11 Drawing Sheets

(56) References Cited

U.S. PATENT DOCUMENTS

| | | | | |
|---|---|---|---|---|
| 4,034,862 A * | 7/1977 | Bahri | ............... | B04C 9/00 |
| | | | | 209/31 |
| 4,094,772 A * | 6/1978 | Hillekamp | ............... | B04C 9/00 |
| | | | | 209/699 |
| 4,308,134 A * | 12/1981 | Lilleker | ............... | B04C 5/13 |
| | | | | 210/512.1 |
| 4,344,538 A * | 8/1982 | Fujisawa | ............... | B04C 5/103 |
| | | | | 55/459.1 |
| 4,581,050 A * | 4/1986 | Krantz | ............... | A47L 9/1445 |
| | | | | 55/432 |
| 4,865,629 A * | 9/1989 | Zievers | ............... | B01D 51/00 |
| | | | | 95/271 |
| 4,995,989 A * | 2/1991 | Carroll | ............... | B04C 3/06 |
| | | | | 269/211 |
| 5,137,545 A * | 8/1992 | Walker | ............... | F23G 5/04 |
| | | | | 95/271 |
| 5,158,583 A * | 10/1992 | Bodin | ............... | G21F 9/005 |
| | | | | 299/1.4 |
| 5,180,486 A * | 1/1993 | Smolensky | ............... | B04C 5/02 |
| | | | | 210/512.1 |
| 5,955,037 A * | 9/1999 | Holst | ............... | B01D 53/14 |
| | | | | 406/48 |
| 6,331,196 B1 | 12/2001 | Alperovitch | | |
| 8,197,765 B2 | 6/2012 | Park | | |
| 10,080,987 B1 * | 9/2018 | Crawford | ............... | E01C 19/1059 |
| 2001/0042496 A1 * | 11/2001 | Tateishi | ............... | F28C 3/06 |
| | | | | 110/342 |
| 2005/0172815 A1 * | 8/2005 | Betting | ............... | B01D 53/002 |
| | | | | 95/32 |
| 2005/0229780 A1 * | 10/2005 | Spink | ............... | B01D 46/50 |
| | | | | 96/53 |
| 2008/0092739 A1 * | 4/2008 | Saito | ............... | B01D 45/12 |
| | | | | 55/315.1 |
| 2008/0134891 A1 * | 6/2008 | Jarvenpaa | ............... | B01D 47/14 |
| | | | | 95/205 |
| 2009/0123352 A1 * | 5/2009 | Spink | ............... | B03C 3/16 |
| | | | | 55/447 |
| 2009/0151565 A1 * | 6/2009 | Tressler | ............... | B01D 47/12 |
| | | | | 96/280 |
| 2011/0146485 A1 * | 6/2011 | Kang | ............... | C21B 13/14 |
| | | | | 95/185 |
| 2011/0209615 A1 * | 9/2011 | Ma | ............... | C04B 35/565 |
| | | | | 95/268 |
| 2011/0252968 A1 * | 10/2011 | M?Kinen | ............... | B01D 45/12 |
| | | | | 55/419 |
| 2014/0352268 A1 * | 12/2014 | Wilson | ............... | B04C 3/06 |
| | | | | 55/439 |
| 2015/0041374 A1 * | 2/2015 | Kramer | ............... | B04C 5/04 |
| | | | | 209/729 |
| 2015/0076037 A1 * | 3/2015 | Yamamoto | ............... | B03B 9/00 |
| | | | | 209/11 |
| 2015/0165364 A1 * | 6/2015 | Ollila | ............... | B01D 47/10 |
| | | | | 96/306 |
| 2017/0307253 A1 * | 10/2017 | Nett | ............... | F23D 14/62 |
| 2018/0050348 A1 * | 2/2018 | Whitney | ............... | B01D 17/0217 |
| 2018/0147516 A1 * | 5/2018 | Scaife | ............... | A61F 13/15617 |
| 2018/0154323 A1 * | 6/2018 | Hisazumi | ............... | B01J 2/16 |
| 2019/0015840 A1 * | 1/2019 | Wulfert | ............... | B04C 5/28 |
| 2019/0017243 A1 * | 1/2019 | Strobel | ............... | E02F 3/8891 |
| 2019/0039078 A1 * | 2/2019 | Chuman | ............... | C10J 3/485 |
| 2019/0321763 A1 * | 10/2019 | Mason | ............... | C21B 7/22 |
| 2022/0032226 A1 * | 2/2022 | Tubergen | ............... | B04C 5/20 |

FOREIGN PATENT DOCUMENTS

| | | |
|---|---|---|
| EP | 1023932 B1 | 8/2000 |
| TW | I293034 | 2/2008 |
| TW | M535595 | 1/2017 |

* cited by examiner

SYSTEM FOR SEPARATION OF GAS AND SOLID

CROSS-REFERENCE TO RELATED APPLICATION

This application claims priority from Taiwan Patent Application No. 109132288, filed on Sep. 18, 2020, in the Taiwan Intellectual Property Office, the content of which are hereby incorporated by reference in their entirety for all purposes.

BACKGROUND OF THE INVENTION

1. Field of Invention

The invention is a gas purification equipment, and more particularly relates to a system for separation of gas and solid capable of generating cyclones to separate a process waste gas and solid particles the process waste gas carries.

2. Description of the Related Art

Process waste gas such as industrial waste gas is generally considered to be the source of various environmental problems. Wet washing towers or scrubbers are often used to trap harmful gases from industrial process waste gas, so the degree of mixing of gas and liquid determines the decontamination ability. In order to increase the degree of mixing, wet scrubbers are divided into spray type, packed tower type, and venturi tube type. Among them, the venturi tube uses the principle of siphon to generate negative pressure to prevent the backflow of harmful gases. Taiwan's utility patent No. M535595 "Delivery tube assembly and gas-liquid mixing stirrer having the same" uses the venturi tube structure to increase the degree of mixing gas with liquid, and uses the flexible tube to prevent blocking by disturbing the solid dust attached on the delivery tube as the water flows. However, the flexible tube will often be broken during the long time usage to cause equipment damage, and the decontamination ability will decrease due to the tube wall being too small and the path being too long. Moreover, this conventional technology will not be able to treat waste gas during maintenance, so it must be shut down for maintenance, which will inevitably lead to the shutdown of the overall manufacturing process. In addition, it may be necessary to have multiple sets of spare equipment, so not only the overall cost will increase, but also the complexity of waste gas treatment will increase. Furthermore, the process waste gas carries solid particles of different particle sizes. However, the larger the particle size of the solid particles, clogging of the washing equipment is likely to occur more frequently, so cleaning is often required.

SUMMARY OF THE INVENTION

In view of the above, an object of the invention is to provide a system for separation of gas and solid to solve the above-mentioned problems of the prior art.

In order to achieve the foregoing object, the invention discloses a system for separation of gas and solid at least comprising: a waste gas treatment device, which is a negative pressure waste gas treatment device that ejects a washing liquid to generate a suction force during washing operation of the negative pressure waste gas treatment device; and at least one cyclone trapping device at least comprising: a gas inlet and outlet chamber, the gas inlet and outlet chamber having a gas inlet tube communicating with a process waste gas source and a gas outlet tube communicating with the waste gas treatment device; and a cyclone separation chamber, the cyclone separation chamber communicating with the gas inlet and outlet chamber, wherein a process waste gas generated by the process waste gas source is introduced into the gas inlet and outlet chamber via the gas inlet tube by a suction force, so that the process waste gas generates cyclones in the gas inlet and outlet chamber and/or the cyclone separation chamber, and solid particles with a particle size greater than a preset value are separated from the process waste gas by centrifugal force, wherein the gas outlet tube is used to transport the centrifugally separated process waste gas to the waste gas treatment device by the suction force, wherein the centrifugally separated process waste gas is cut into micro air bubbles in the washing operation of the negative pressure waste gas treatment device, wherein the rest solid particles with a particle size equal to or smaller than the preset value can be captured by the micro air bubbles and the centrifugally separated process waste gas can be dissolved in the washing liquid to obtain a washed gas.

Preferably, the suction force is co-generated by a pump provided between the waste gas treatment device and the cyclone trapping device.

Preferably, the system for separation of gas and solid of the invention further comprises a plasma asher disposed between the gas inlet and outlet chamber and the waste gas treatment device and/or disposed between the gas inlet and outlet chamber and the process waste gas source in order to miniaturize solid particles carried by the process waste gas.

Preferably, the plasma asher is a low-pressure plasma asher, which is turned on only when the process waste gas is generated by the process waste gas source.

Preferably, a numerical value of the preset value is greater than 0.01 μm.

Preferably, the cyclone separation chamber has a solid particle collection port.

Preferably, the system for separation of gas and solid of the invention further comprises a collection tank communicated with the cyclone separation chamber, so as to collect the solid particles in the collection tank through the solid particle collection port.

Preferably, the cyclone separation chamber further has a first on-off valve disposed at the solid particle collection port.

Preferably, the cyclone separation chamber or the collection tank further comprises a discharge tube communicated with a filter component of the waste gas treatment device, so as to discharge the solid particles to the waste gas treatment device.

Preferably, the discharge tube has a second on-off valve.

Preferably, a suction port of the gas outlet tube is movably located on a chamber of the gas inlet and outlet chamber and extends into the inside of the gas inlet and outlet chamber with a distance inversely proportional to a flow rate of the process waste gas.

Preferably, an opening direction of the suction port of the gas outlet tube is kept away from a solid particle collection port of the cyclone separation chamber and/or an opening direction of a gas outlet port of the gas inlet tube.

Preferably, a direction in which the process waste gas enters the suction port of the gas outlet tube is substantially perpendicular or parallel to a direction in which the gas outlet tube transports the process waste gas.

Preferably, a value of a height of the gas inlet and outlet chamber divided by a value of an inner diameter of the gas inlet and outlet chamber is between 1 and 2, and/or a value of a height of the cyclone separation chamber divided by the value of an inner diameter of the gas inlet and outlet chamber is between 1 and 2.

Preferably, the process waste gas enters the gas inlet and outlet chamber and/or the cyclone separation chamber in a direction substantially parallel to a tangential direction of a chamber of the gas inlet and outlet chamber in order to generate cyclones, and the process waste gas enters the gas inlet and outlet chamber at an angle less than 90 degrees relative to an axial direction of the chamber of the gas inlet and outlet chamber.

Preferably, the cyclone separation chamber is a conical chamber, and the gas inlet and outlet chamber is a cylindrical chamber or a conical chamber.

Preferably, a flow rate of the process waste gas being introduced into the gas inlet and outlet chamber is less than 1,000 SLM.

Preferably, a quantity of the cyclone trapping device is more than one, and the cyclone trapping devices are connected in series and/or in parallel to communicate with one another.

Preferably, a quantity of the cyclone trapping device is more than one, and the gas outlet tube of one of the adjacent cyclone trapping devices is communicated in series with the gas inlet tube of the other adjacent cyclone trapping device.

Preferably, a quantity of the cyclone trapping device is more than one, the gas inlet tube of one of the adjacent cyclone trapping devices is communicated in parallel with the gas inlet tube of the other adjacent cyclone trapping device, and the gas outlet tube of one of the adjacent cyclone trapping devices is communicated in parallel with the gas outlet tube of the other adjacent cyclone trapping device.

In summary, the system for separation of gas and solid of the invention can have one or more than one of the following advantages: (1) by generating cyclones in the process waste gas, the solid particles can be separated and trapped; (2) by collecting the solid particles in the collection tank, the trapped solid particles can be removed without shutting down the process waste gas source or the negative pressure waste gas treatment device; (3) by ashing the process waste gas with the plasma asher, the solid particles can be miniaturized in advance before the negative pressure waste gas treatment device separates the process waste gas; (4) by communicating the negative pressure waste gas treatment device with the discharge tube, the trapped solid particles can be discharged without shutting down the process waste gas source or the negative pressure waste gas treatment device; (5) with collaboration between the cyclone trapping device and the negative pressure waste gas treatment device, cleaning and maintenance cycles can be extended, that is, it is not required to frequently clean and maintain the inside of the chamber of the negative pressure waste gas treatment device; (6) with the cyclone trapping devices being connected in series and/or in parallel, a trapped rate of the solid particles can be increased, thereby further extending the cleaning and maintenance cycles; and (7) by reducing a surface roughness, the solid particles carried by the process waste gas can be prevented from attaching to the inner surface of the chamber and the tube.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
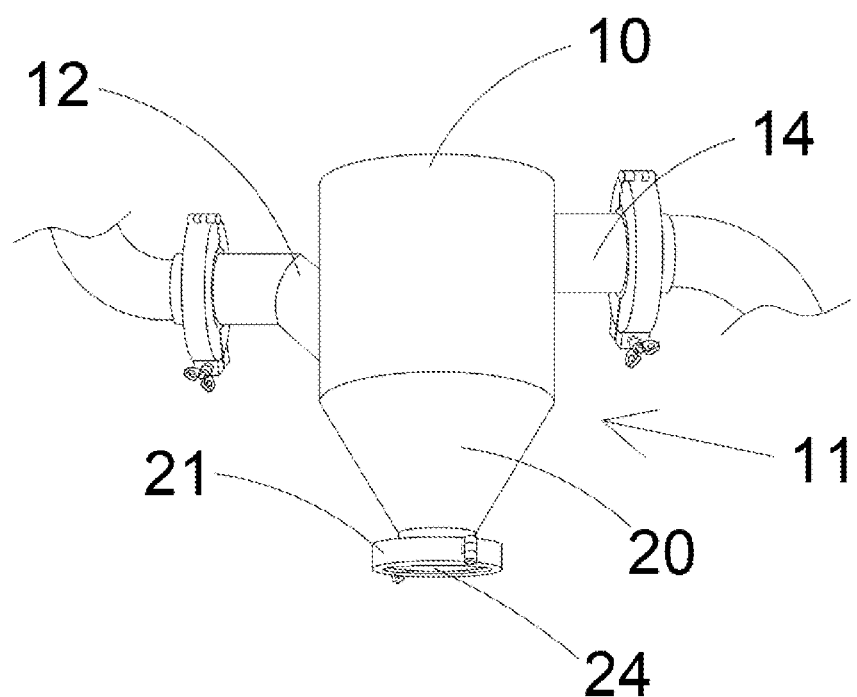
FIG. 1 is a perspective view of a cyclone trapping device of a system for separation of gas and solid of a first embodiment of the invention.
Figure 2:
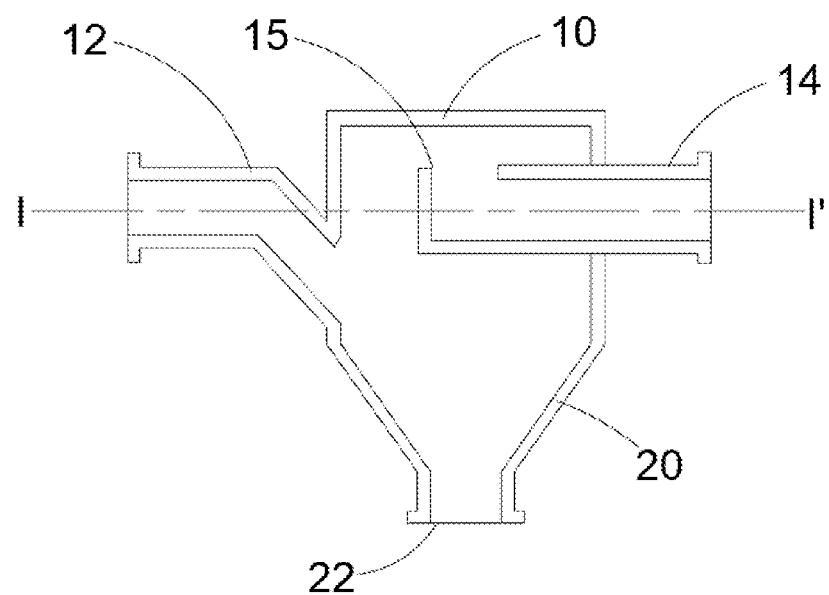
FIG. 2 is a side sectional view of the cyclone trapping device of the system for separation of gas and solid of the first embodiment of the invention.
Figure 3:
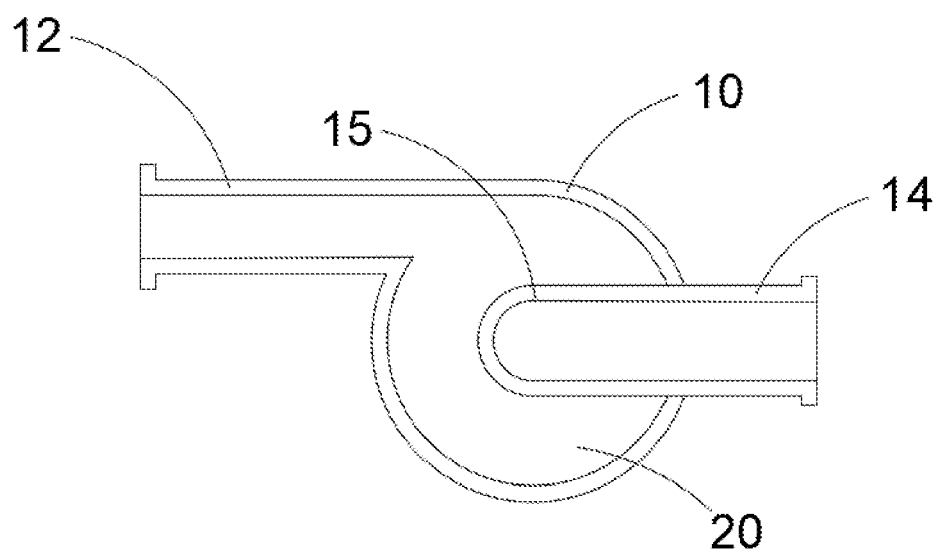
FIG. 3 is a top sectional view taken along the section line I-I' in FIG. 2.
Figure 4:
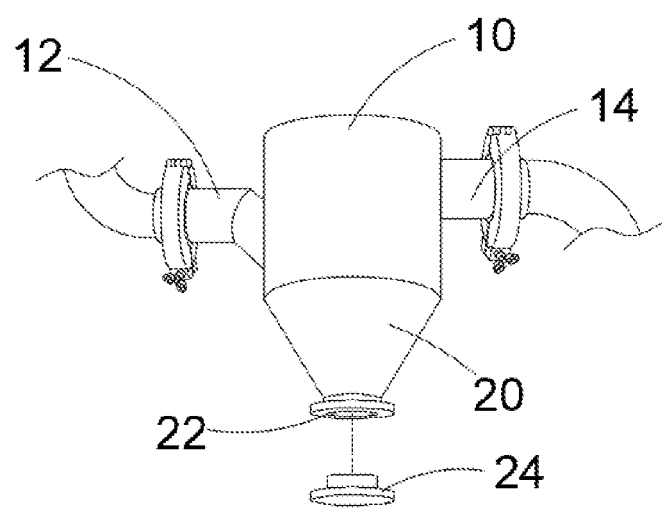
FIG. 4 is a perspective view of the cyclone trapping device of the system for separation of gas and solid of the first embodiment of the invention, in which a first on-off valve opens a solid particle collection port.
Figure 5:
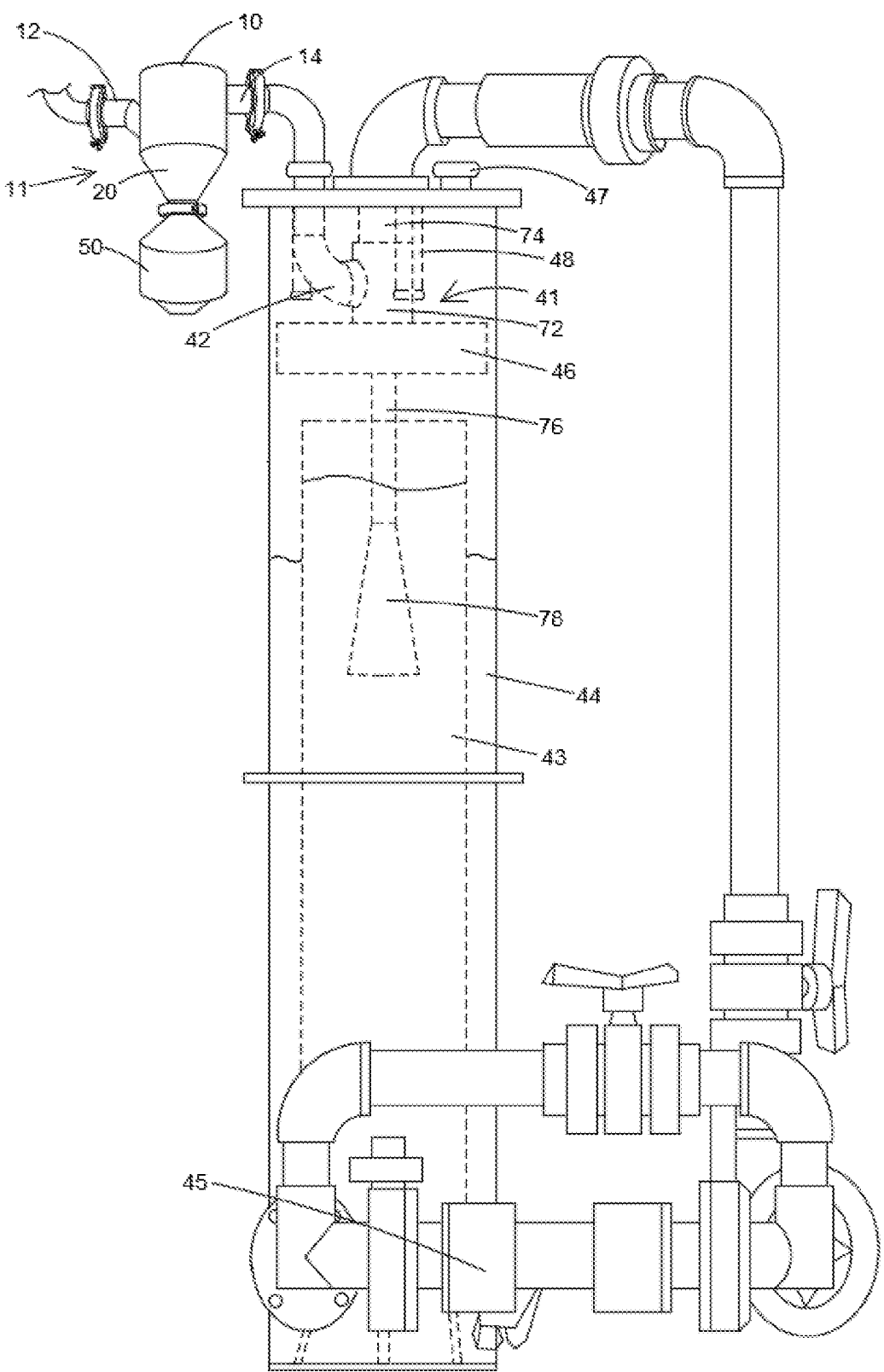
FIG. 5 is a perspective view of the cyclone trapping device of the system for separation of gas and solid of the first embodiment of the invention communicating with a negative pressure waste gas treatment device.
Figure 6:
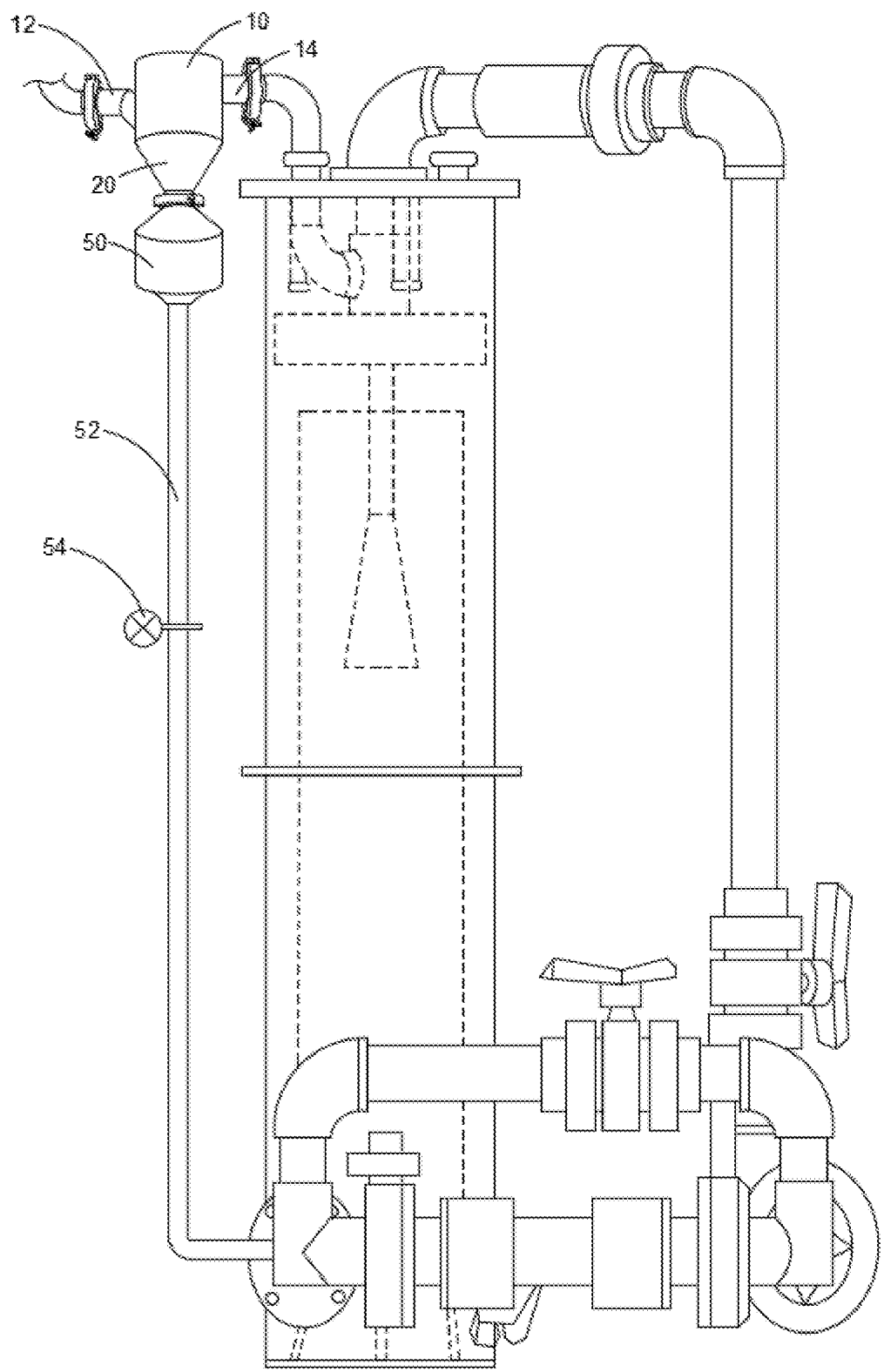
FIG. 6 is a perspective view of the cyclone trapping device of the first embodiment of the invention communicating with the negative pressure waste gas treatment device, in which a collection tank has a discharge tube communicating with the negative pressure waste gas treatment device.
Figure 7:
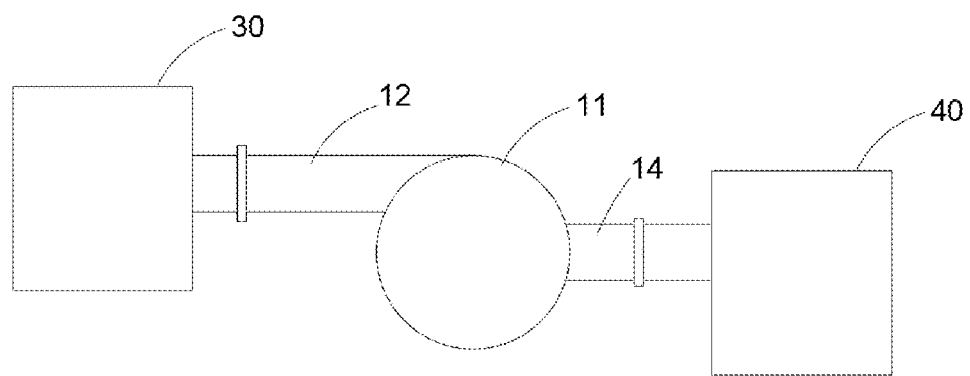
FIG. 7 is a block diagram of the system for separation of gas and solid of the first embodiment of the invention.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

Please refer to FIG. 1 to FIG. 7, a system for separation of gas and solid of a first embodiment of the invention at least comprises a cyclone trapping device 11 disposed between a process waste gas source 30 and a waste gas treatment device for treating a process waste gas generated by the process waste gas source 30 by using the cyclone trapping device 11 and the waste gas treatment device. The cyclone trapping device 11 at least comprises a gas inlet and outlet chamber 10 and a cyclone separation chamber 20 that are communicating with each other. In the cyclone trapping device 11 of the invention, a chamber of the gas inlet and outlet chamber 10 is provided with a gas inlet tube 12 and a gas outlet tube 14 with two open ends, respectively, both the gas inlet tube 12 and the gas outlet tube 14 are hollow tubes, wherein one of the open ends of the gas inlet tube 12 is communicating with the inside of the gas inlet and outlet chamber 10, and the other open end of the gas inlet tube 12 is directly or indirectly communicating with the external process waste gas source 30. By communicating with the gas inlet and outlet chamber 10 and the process waste gas source 30, the process waste gas generated by the process waste gas source 30 that carries dusts such as solid particles with inconsistent particle sizes is introduced, the process waste gas is caused to generate cyclones in the gas inlet and outlet chamber 10 and/or the cyclone separation chamber 20, and centrifugal force is used to separate solid particles with a particle size larger than a preset value from the process waste gas, so as to achieve an object of trapping solid particles.

The process waste gas source 30 is, for example, a semiconductor process chamber that can generate process waste gas, but it is not limited thereto, as long as the process equipment that can provide gas carrying solid particles falls within the scope of the invention. One of the open ends of the gas outlet tube 14 is a suction port 15, the suction port 15 is communicating with the inside of the gas inlet and outlet chamber 10, and preferably extending into the inside of the gas inlet and outlet chamber 10, and the other open end of the gas outlet tube 14 is directly or indirectly communicating with the external waste gas treatment device, such as a negative pressure waste gas treatment device 40. By communicating with the gas inlet and outlet chamber 10 and the negative pressure waste gas treatment device 40, the process waste gas that has been separated is guided to the negative pressure waste gas treatment device 40 by a suction force to further trap solid particles with remaining particle sizes in the process waste gas. In other words, although the negative pressure waste gas treatment device 40 capable of generating negative pressure (for example, ranged from about 400 torr to about 600 torr) suction force is used for the waste gas treatment device of the invention, it is not intended to limit the invention. The invention can also be applied to other types of waste gas treatment devices, or pumps such as suction equipment and/or exhaust equipment can be disposed between the cyclone trapping device 11 and the waste gas treatment device, for example, pumps such as air extraction equipment and/or exhaust equipment, which co-generates the suction force, can be optionally installed to communicate with the gas inlet tube 12 and/or the gas outlet tube 14 to transport the process waste gas. Since a person having ordinary skill in the art to which the invention belongs, based on the description of the invention, should be able to understand how to set up air extraction equipment and/or exhaust equipment to transport the process waste gas, so it will not be repeated here.

In the cyclone trapping device 11 of the system for separation of gas and solid of the invention, the gas inlet and outlet chamber 10 is, for example, a hollow cylindrical chamber or a hollow conical chamber with an inner diameter tapering downwardly; the cyclone separation chamber 20 is, for example, a hollow conical chamber with an inner diameter tapering downwardly, wherein the gas inlet and outlet chamber 10 is communicating with the cyclone separation chamber 20. A bottom of the gas inlet and outlet chamber 10 is preferably integrally connecting with a top of the cyclone separation chamber 20, but it is not limited thereto. For example, the gas inlet and outlet chamber 10 of the invention can also be fixedly or detachably connecting with the cyclone separation chamber 20. In addition, the gas inlet tube 12 is disposed on the chamber of the gas inlet and outlet chamber 10, an axial direction of a tube body of the gas inlet tube 12 is substantially parallel to a tangential direction of the chamber of the gas inlet and outlet chamber 10, the gas inlet tube 12 is preferably disposed obliquely on the chamber of the gas inlet and outlet chamber 10, that is, the axial direction of the tube body of the gas inlet tube 12 is preferably non-parallel to a cross section of the chamber of the gas inlet and outlet chamber 10. For example, the axial direction of the tube body of the gas inlet tube 12 is preferably relative to the cross section of the chamber of the gas inlet and outlet chamber 10 at an angle substantially less than 90 degrees.

Therefore, the process waste gas generated by the process waste gas source 30 can be introduced into the gas inlet and outlet chamber 10 through the gas inlet tube 12 in a direction substantially parallel to the tangential direction of the chamber of the gas inlet and outlet chamber 10, and the process waste gas can be introduced into the gas inlet and outlet chamber 10 in an inclined direction downwardly so that the process waste gas is capable of generating cyclones in the gas inlet and outlet chamber 10. Wherein, a cyclone direction of the process waste gas depends on a disposed position of the gas inlet tube 12 relative to the gas inlet and outlet chamber 10. For example, if the gas inlet tube 12 is disposed on a left side of the gas inlet and outlet chamber 10, the process waste gas introduced into the gas inlet and outlet chamber 10 will rotate from the left side of the gas inlet and outlet chamber 10 to a right side of the gas inlet and outlet chamber 10, which is a clockwise cyclone. Conversely, if the gas inlet tube 12 is disposed on the right side of the gas inlet and outlet chamber 10, the process waste gas introduced into the gas inlet and outlet chamber 10 will rotate from the right side of the gas inlet and outlet chamber 10 to the left side of the gas inlet and outlet chamber 10, which is a counter-clockwise cyclone.

In addition, since the gas inlet tube 12 is diagonally disposed on the chamber of the gas inlet and outlet chamber 10 downwardly, when the process waste gas enters the gas inlet and outlet chamber 10 through the gas inlet tube 12 downwardly, the process waste gas will follow a flow trend and enter the cyclone separation chamber 20, and cyclones that travel and rotate downwardly are generated. Since the process waste gas carries solid particles with inconsistent particle sizes, and a weight of the solid particles is greater than a weight of the gas, when the process waste gas generates cyclones, centrifugal force generated by rotation is capable of separating solid particles with a particle size substantially larger than a preset value from the process waste gas, and therefore capable of achieving an object of trapping solid particles. Wherein the above-mentioned preset value is, for example, between 2 μm and 0.01 μm, but it is not limited thereto, the preset value is preferably greater than 0.01 μm. In addition, since the cyclone separation chamber 20 is a conical chamber with an inner diameter tapering downwardly, the solid particles will rotate downward along a chamber of the cyclone separation chamber 20 to a solid particle collection port 22 at a bottom of the cyclone separation chamber 20, thereby achieving an object of separating and trapping solid particles from the process waste gas. One feature of the invention is that by making the process waste gas generate cyclones that travel and rotate downwardly, an effect of separating solid particles with a particle size substantially larger than the preset value from the process waste gas can be achieved.

The cyclone separation chamber 20 of the invention can optionally have a first on-off valve 24 disposed at the solid particle collection port 22 to control opening or closing of the solid particle collection port 22. Form and type of the first on-off valve 24 are not particularly limited, for example, the first on-off valve 24 can be a fixed or detachable control valve provided at the solid particle collection port 22, or the first on-off valve 24 can be a sealing plate detachably clamped on the solid particle collection port 22 by a clamping member 21. Another feature of the invention is that by controlling the first on-off valve 24 to open the solid particle collection port 22, solid particles can be removed from the solid particle collection port 22. Wherein, the clamping member 21 is omitted in some of the figures in order to clearly show the overall illustration.

In addition, the cyclone trapping device 11 of the invention can further optionally have a collection tank 50 so as to have a better solid particle collection effect and be capable of effectively preventing dust phenomenon from raising solid particles. A top end of the collection tank 50 is an opening, and the opening corresponds to the solid particle collection port 22 of the cyclone separation chamber 20. The collection tank 50 can be, for example, a conical chamber, a cylindrical chamber, or any combination thereof. For example, the collection tank 50 can be composed of a conical chamber with a tube diameter that gradually widens downwardly, a cylindrical chamber, and a conical chamber with a tube diameter that gradually narrows downwardly. In other words, the collection tank 50 of the invention is not limited to a specific shape, as long as the collection tank 50 is capable of storing solid particles, it falls within the scope of the claims of the invention. Wherein the collection tank 50 can be, for example, fixedly or detachably communicated with the cyclone separation chamber 20. Taking the collection tank 50 detachably communicating with the cyclone separation chamber 20 as an example, the first on-off valve 24 of the invention can be fixedly or detachably provided at the solid particle collection port 22 to open the solid particle collection port 22 according to a form of the first on-off valve 24, or the first on-off valve 24 can even be omitted, and the collection tank 50 can be communicated with the solid particle collection port 22 of the cyclone separation chamber 20, and then a connection between the cyclone separation chamber 20 and the collection tank 50 can be clamped, for example, by the clamping member 21. Therefore, if the solid particle collection port 22 is open and the solid particle collection port 22 is communicating with the collection tank 50, the separated solid particles can enter the collection tank 50 through the solid particle collection port 22 and be temporarily stored in the collection tank 50. When the solid particles temporarily stored in the collection tank 50 need to be removed, a user only needs to close the solid particle collection port 22 and then remove the collection tank 50 to pour out the solid particles from an opening of the collection tank 50. In other words, in the invention, when removing the solid particles temporarily stored in the collection tank 50, the process waste gas source 30 and/or the negative pressure waste gas treatment device 40 do/does not need to be shut down, so an efficacy of continuous and uninterrupted treatment of the process waste gas can be achieved.

In addition, taking the collection tank 50 being fixedly or detachably communicating with the cyclone separation chamber 20 as an example, the collection tank 50 of the invention can optionally have a discharge tube 52, wherein the discharge tube 52 can be communicating with the cyclone separation chamber 20 or the collection tank 50, for example. For example, the collection tank 50 can be further communicating with a filter component 45 of the negative pressure waste gas treatment device 40 via the discharge tube 52, so as to discharge solid particles to the negative pressure waste gas treatment device 40 for removal treatment. Wherein, the discharge tube 52 is preferably disposed longitudinally, and solid particles can be discharged into the negative pressure waste gas treatment device 40 by their own weights by gravity, so as to remove the solid particles, for example, by filtering. The discharge tube 52 of the collection tank 50 can optionally have a second on-off valve 54, and the second on-off valve 54 can be any type of on-off valve for controlling opening or closing of the discharge tube 52. In addition, in order to obtain a better solid particle separation effect, in the invention, a value of a height of the gas inlet and outlet chamber 10 divided by a value of an inner diameter of the gas inlet and outlet chamber 10 is preferably between 1 and 2, and/or a value of a height of the cyclone separation chamber 20 divided by a value of an inner diameter of the gas inlet and outlet chamber 10 is preferably between 1 and 2. However, this numerical value is only an example and is not intended to limit the scope of the claims of the invention.

In addition, in the cyclone trapping device 11 of the invention, one of the open ends of the gas outlet tube 14 of the gas inlet and outlet chamber 10 is the suction port 15, and the suction port 15 is communicating with the inside of the gas inlet and outlet chamber 10, an opening direction of the suction port 15 is preferably kept away from the solid particle collection port 22 and/or a gas outlet port of the gas inlet tube 12 to avoid inhalation of solid particles. For example, the gas outlet tube 14 of the gas inlet and outlet chamber 10 can preferably extend to the inside of the gas inlet and outlet chamber 10, and the suction port 15 thereof can be located, for example, on a central axis of the gas inlet and outlet chamber 10, wherein a direction in which the process waste gas enters the suction port 15 of the gas outlet tube 14 is, for example, substantially perpendicular or parallel to a direction in which the gas outlet tube 14 outputs the process waste gas, that is, an opening direction of the suction port 15 can be facing upward or sideward, for example. However, a design of the gas outlet tube 14 and the opening direction of the suction port 15 of the invention are not limited to the above examples, the suction port 15 of the gas outlet tube 14 can also be provided on the chamber of the gas inlet and outlet chamber 10, for example; or the suction port 15 of the gas outlet tube 14 can also face downward, for example, as long as the process waste gas can be sucked out, it belongs to the scope of the claims of the invention. In addition, the gas outlet tube 14 can be provided on a side wall or a top wall of the chamber of the gas inlet and outlet chamber 10, so as to extend into the gas inlet and outlet chamber 10, for example. Moreover, the suction port 15 of the gas outlet tube 14 can be provided, for example, on one end or a tube body of the gas outlet tube 14, and a direction in which the process waste gas enters the suction port 15 is not limited to be perpendicular to a direction in which the gas outlet tube 14 outputs the process waste gas, it can be, for example, parallel to a direction in which the gas outlet tube 14 outputs the process waste gas. Wherein, the suction port 15 of the gas outlet tube 14 is movably located on a chamber of the gas inlet and outlet chamber 10 and extends into the inside of the gas inlet and outlet chamber 10 with a distance inversely proportional to a flow rate of the process waste gas. Namely, the gas outlet tube 14 is movably disposed on the gas inlet and outlet chamber 10 by manual or electro-mechanical means, which is for example an electric cylinder or a pneumatic cylinder, wherein the gas outlet tube 14 is preferably moved by the electro-mechanical means according to the flow rate of the process waste gas.

Because the other open end of the gas outlet tube 14 of the gas inlet and outlet chamber 10 is directly or indirectly communicating with the external negative pressure waste gas treatment device 40, with a negative pressure suction force generated during washing operation of the negative pressure waste gas treatment device 40, the process waste gas that has been separated can be sucked from the suction port 15 of the gas outlet tube 14 and the process waste gas can be transported to the negative pressure waste gas treatment device 40 in order to further separate the process waste gas. Wherein, since solid particles having a particle size substantially larger than a preset value have been separated from the process waste gas, the negative pressure waste gas treatment device 40 is capable of further separating solid particles having a particle size substantially smaller than or equal to the preset value in the process waste gas.

A wet treatment device of venturi tube principle is used for the negative pressure waste gas treatment device 40 as an example, wherein the negative pressure waste gas treatment device 40 uses, for example, a negative pressure jet tube 41 to eject a washing liquid at a high speed to generate negative pressure, so as to suck in the process waste gas that has completed trapping of solid particles via a gas tube 42 communicating with the gas outlet tube 14 of the gas inlet and outlet chamber 10. When the washing liquid impacts the washing liquid in an inner tank 43 of a treatment tank downwardly at a high speed, the process waste gas will be cut into micro air bubbles, during a process of the micro air bubbles moving upward from a depth of the washing liquid in the inner tank 43 of the treatment tank, the micro air bubbles are capable of fully mixing with the solid particles of remaining particle sizes such as smaller than the preset value in the process waste gas so as to capture the foregoing rest solid particles with the particle size equal to or smaller than the preset value and to dissolve the process waste gas to obtain a washed gas. In addition, the more the micro air bubbles being generated, the more solid particles will be captured and the more the process waste gas will be dissolved, the micro air bubbles will diffuse upwardly from the washing liquid in the inner tank 43 of the treatment tank to a liquid level, and further diffuse to reach above an outer tank 44 of the treatment tank and burst, so that the solid particles of remaining particle sizes captured by the micro air bubbles fall into the washing liquid in the outer tank 44. Subsequently, the filter component 45 is used to filter the washing liquid in the outer tank 44 of the treatment tank to filter out the solid particles. Therefore, the washing liquid that has been filtered to remove solid particles can be re-injected into the inner tank 43 of the treatment tank, thereby generating negative pressure and cutting the process waste gas into micro air bubbles. Wherein, when the micro air bubbles diffuse to reach above the inner tank 43 of the treatment tank, a gas-liquid separation component 46 is capable of playing a role of filtering and trapping water vapor and solid particles and only allowing gas to pass through the gas-liquid separation component 46, so that the washed gas, which is dried process waste gas that has been washed, can be discharged from a discharge passage 47. A gas-liquid separation component can also be added in the discharge passage 47 to discharge drier washed gas by trapping water vapor thereof. Wherein the negative pressure waste gas treatment device 40 can, for example, use a spray component 48 to clean the gas-liquid separation component 46 to cause solid particles fall into the washing liquid in the inner tank 43 or the outer tank 44. The gas-liquid separation component 46 is, for example, a fiber bed demister composed of glass fibers with a diameter of about 100 μm to 1 μm, so as to filter out water vapor and solid particles and only allow gas to pass therethrough. The negative pressure jet tube 41 has, for example, a suction chamber 72 and a jet tube 74, a side wall of the suction chamber 72 has at least one suction port for communicating with the gas tube 42. A top end of the jet tube 74 is an entrance port for injecting washing liquid, a bottom end of the jet tube 74 is an ejection port extending to the inside of the suction chamber 72, and a negative pressure suction force is generated by ejecting the washing liquid into the suction chamber 72. Wherein a bottom of the suction chamber 72 is communicated with a mixing tube 76 and a diffusion tube 78 in sequence, and the mixing tube 76 and/or the diffusion tube 78 are/is immersed in the washing liquid in the inner tank 43 in order to increase the time of the micro air bubbles in the washing liquid. In addition, the inside of the suction chamber 72 and/or the gas tube 42 can optionally have a cleaning element for spraying fluids such as gas and/or liquid, so as to achieve an efficacy of cleaning the inside of the suction chamber 72 and/or the gas tube 42.

Figure 8:
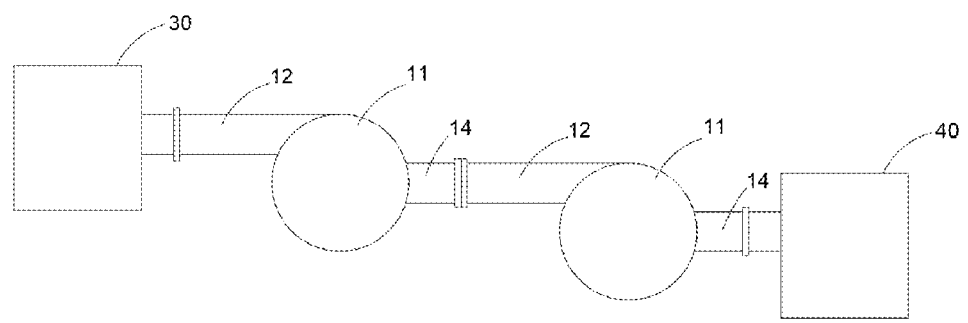
FIG. 8 is a block diagram of the system for separation of gas and solid with the tandem-type cyclone trapping devices of a second embodiment of the invention.
Figure 9:
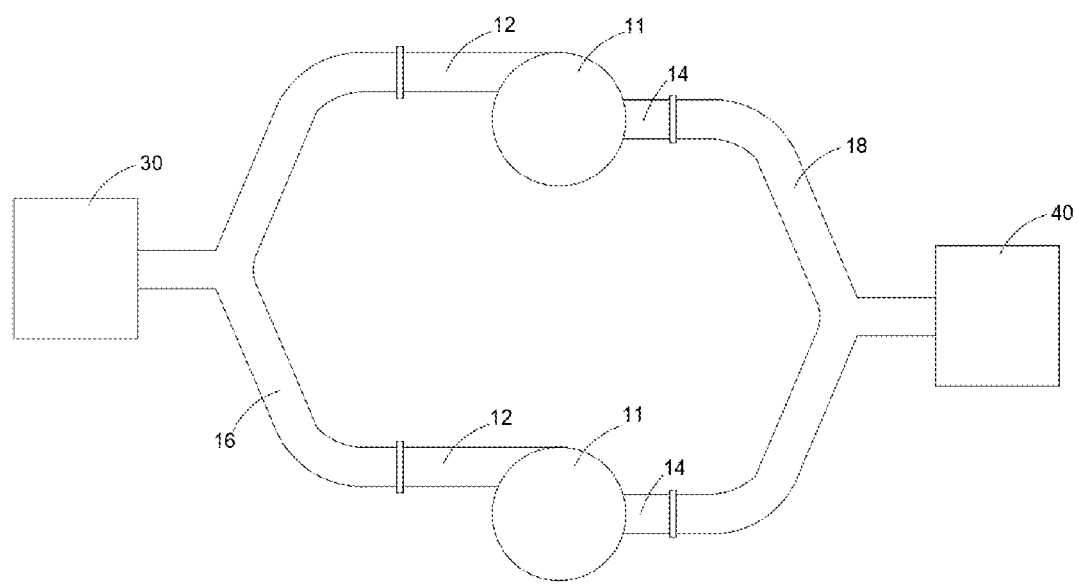
FIG. 9 is a block diagram of the system for separation of gas and solid with the parallel-type cyclone trapping devices of the second embodiment of the invention.

As shown in FIGS. 8 and 9, the system for separation of gas and solid of the invention can have a plurality of the cyclone trapping devices 11, that is, in addition to having a single set of the gas inlet and outlet chamber 10 and the cyclone separation chamber 20, the system for separation of gas and solid can also have a plurality of the gas inlet and outlet chambers 10 and the cyclone separation chambers 20, and quantity and way of combination thereof are not particularly limited, as long as an object of separating solid particles from the process waste gas can be achieved, they belong to the scope of the claims of the invention. In addition, structures of the gas inlet and outlet chamber 10 and the cyclone separation chamber 20 of the cyclone trapping device 11 can be the same as those described in the first embodiment, so they will not be repeated here. In a second embodiment of the invention, for example, the cyclone trapping devices 11 of the invention can be connected in series, in parallel, or in series and in parallel configurations. Taking the series configuration as an example, in the cyclone trapping devices 11, the gas outlet tube 14 of the former of the two adjacent gas inlet and outlet chambers 10 is communicated in series with the gas inlet tube 12 of the latter gas inlet and outlet chamber 10. In addition, the gas inlet tube 12 and the gas outlet tube 14 of the two outermost gas inlet and outlet chambers 10 are respectively communicating with the process waste gas source 30 and the negative pressure waste gas treatment device 40 as described above, so they will not be repeated here. Taking the parallel configuration as an example, in the cyclone trapping devices 11, the gas inlet tube 12 of one of the two adjacent gas inlet and outlet chambers 10 is communicated in parallel with the gas inlet tube 12 of the other gas inlet and outlet chamber 10 through a communicating tube 16, for example. One end of the communicating tube 16 is communicating with the process waste gas source 30 in order to introduce the process waste gas, and the gas outlet tube 14 of one of the two adjacent gas inlet and outlet chambers 10 is, for example, communicated in parallel with the gas outlet tube 14 of the other gas inlet and outlet chamber 10 through another communicating tube 18, and one end of the communicating tube 18 is communicating with the negative pressure waste gas treatment device 40. Taking the series and parallel configurations as an example, the cyclone trapping devices 11 can have the gas inlet and outlet chambers 10 connected in parallel and in series, and the cyclone separation chambers 20 are communicating with the corresponding gas inlet and outlet chambers 10, wherein the ways of connection in parallel and in series are the same as above, so they will not be repeated here.

Figure 10:
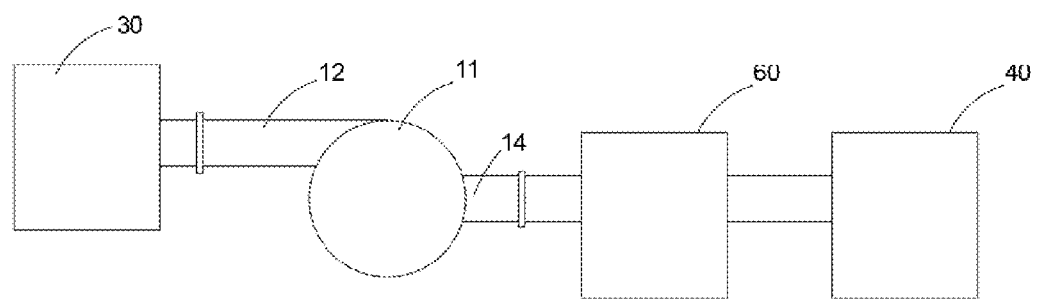
FIG. 10 is a block diagram of the system for separation of gas and solid of a third embodiment of the invention.

As shown in FIG. 10, in a third embodiment of the invention, the system for separation of gas and solid of the invention further optionally comprises a plasma asher 60, which is preferred a low-pressure (for example, ranged from about 100 torr to about $10^{-3}$ torr) plasma asher, wherein the plasma asher 60 is, for example, disposed between the gas inlet and outlet chamber 10 and the negative pressure waste gas treatment device 40 in the aforementioned embodiments, that is, the process waste gas is capable of entering the plasma asher 60 from the gas inlet and outlet chamber 10 through the gas outlet tube 14. After plasma ashing is completed, the process waste gas enters the negative pressure waste gas treatment device 40 through the gas outlet tube 14 or another tube, so that the process waste gas is pre-ashed before the negative pressure waste gas treatment device 40 separates the process waste gas in order to further miniaturize the solid particles. Wherein, the plasma asher 60 is turned on only when the process waste gas is generated by the process waste gas source. Namely, the plasma asher 60 is operated simultaneously with the generation of the process waste gas. Wherein, the plasma asher 60 can be any form or type of plasma asher, as long as a particle size of the solid particles carried in the process waste gas substantially greater than, less than or equal to the preset value can become smaller, such plasma asher belongs to the scope of the claims of the invention. In the same way, the plasma asher 60 can be, for example, disposed between the gas inlet and outlet chamber 10 and the process waste gas source 30 of the aforementioned embodiments, so that the process waste gas is preliminarily ashed before the process waste gas is introduced into the gas inlet and outlet chamber 10 for centrifugal separation in order to further miniaturize the solid particles.

In the system for separation of gas and solid of the invention, all surfaces that will contact the process waste gas or the solid particles carried by the process waste gas, such as surfaces of the gas inlet and outlet chamber 10, the cyclone separation chamber 20, the gas inlet tube 12 and/or the gas outlet tube 14, for example, can be pre-treated with smoothing or lubrication treatment such as polishing, coating or modification to reduce a surface roughness, thereby preventing the solid particles from attaching to an inner wall of the chamber and/or the tube to obstruct the flow of the process waste gas, and maintaining smooth flow of the process waste gas. The smaller the surface roughness, not only the more effective the solid particles can be prevented from attaching or depositing, but the better a trapped rate of the solid particles. In addition, in the cyclone trapping device 11 of the invention, a material of the gas inlet and outlet chamber 10, the cyclone separation chamber 20, the gas inlet tube 12 and/or the gas outlet tube 14 can be, for example, but not limited to, stainless steel or plastic.

Figure 11:
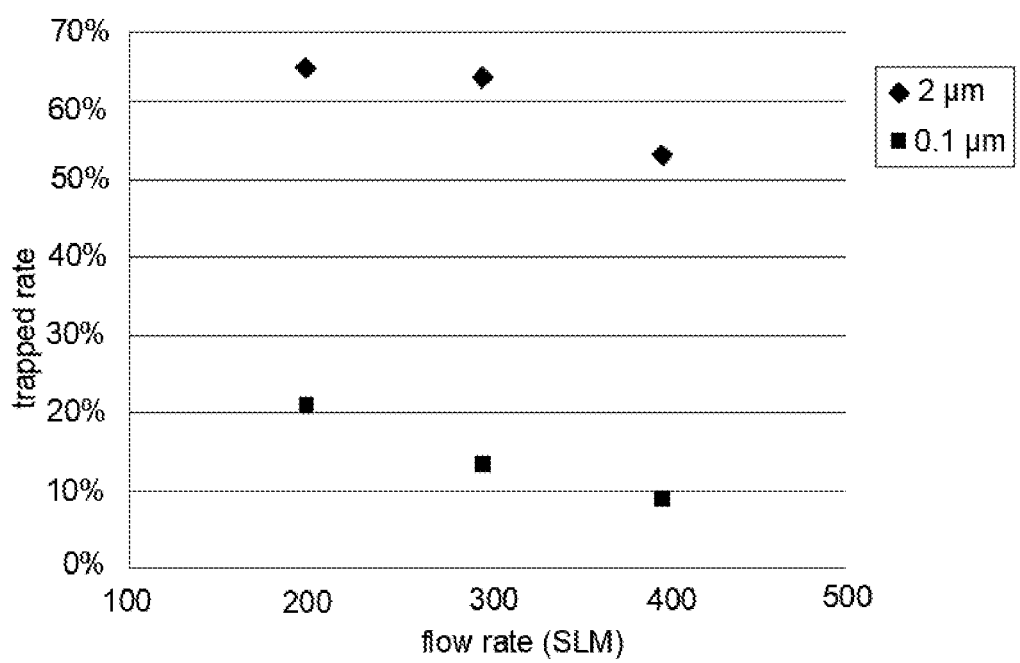
FIG. 11 is a data diagram showing a removal rate of solid particles of the cyclone trapping device of the first embodiment of the invention.

As shown in FIG. 11, which is a data diagram showing a removal rate of solid particles of the cyclone trapping device 11 of the first embodiment of the invention, wherein the x-axis is flow rate, and the y-axis is trapped rate. The gas inlet and outlet chamber 10 of the invention has the gas inlet tube 12 communicating with the process waste gas source 30, wherein the process waste gas source 30 provides the process waste gas, and a flow rate of the process waste gas being introduced into the gas inlet and outlet chamber 10 is, for example, less than about 1,000 SLM, preferably less than about 800 SLM, and more preferably less than about 200 SLM. Taking a flow rate of the process waste gas of 200 SLM as an example, a trapped rate of solid particles with a particle size of 2 μm can reach about 65%, and a trapped rate of solid particles with a particle size of 0.1 μm can reach about 20%.

In summary, the system for separation of gas and solid of the invention can have one or more than one of the following advantages: (1) by generating cyclones in the process waste gas, the solid particles can be separated and trapped; (2) by collecting the solid particles in the collection tank, the trapped solid particles can be removed without shutting down the process waste gas source or the negative pressure waste gas treatment device; (3) by ashing the process waste gas with the plasma asher, the solid particles can be miniaturized in advance before the negative pressure waste gas treatment device separates the process waste gas; (4) by communicating the negative pressure waste gas treatment device with the discharge tube, the trapped solid particles can be discharged without shutting down the process waste gas source or the negative pressure waste gas treatment device; (5) with collaboration between the cyclone trapping device and the negative pressure waste gas treatment device, cleaning and maintenance cycles can be extended, that is, it is not required to frequently clean and maintain the inside of the chamber of the negative pressure waste gas treatment device; (6) with the cyclone trapping devices being connected in series and/or in parallel, a trapped rate of the solid particles can be increased, thereby further extending the cleaning and maintenance cycles; and (7) by reducing a surface roughness, the solid particles carried by the process waste gas can be prevented from attaching to the inner surface of the chamber and the tube.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A system for separation of gas and solid at least comprising:
   a waste gas treatment device, which is a negative pressure waste gas treatment device that ejects a washing liquid to generate a suction force during washing operation of the negative pressure waste gas treatment device; and
   at least one cyclone trapping device at least comprising:
      a gas inlet and outlet chamber, the gas inlet and outlet chamber having a gas inlet tube communicating with a process waste gas source and a gas outlet tube communicating with the waste gas treatment device, wherein a suction port of the gas outlet tube with an opening direction facing upward is extended into the inside of the gas inlet and outlet chamber with a distance; and a cyclone separation chamber, the cyclone separation chamber communicating with a bottom of the gas inlet and outlet chamber, wherein a process waste gas that carries solid particles with a particle size greater than a preset value and the rest solid particles with a particle size equal to or smaller than the preset value is generated by the process waste gas source and introduced into the gas inlet and outlet chamber via the gas inlet tube by the suction force, so that the process waste gas, which is rotated downward, generates cyclones in the gas inlet and outlet chamber and/or the cyclone separation chamber, and the solid particles with the particle size greater than the preset value are rotated downward and separated from the process waste gas by centrifugal force, wherein the gas outlet tube is used to transport the centrifugally separated process waste gas to the waste gas treatment device by the suction force, wherein the opening direction of the suction port of the gas outlet tube is kept away from an opening direction of a gas outlet port of the gas inlet tube for avoiding inhalation of the solid particles carried by the process waste gas and kept away from a solid particle collection port of the cyclone separation chamber for avoiding inhalation of the solid particles separated by the centrifugal force, wherein the centrifugally separated process waste gas that carries the rest solid particles with the particle size equal to or smaller than the preset value is cut into micro air bubbles by the ejection of the washing liquid that generates the suction force during the washing operation of the negative pressure waste gas treatment device, wherein the rest solid particles with the particle size equal to or smaller than the preset value can be captured by the micro air bubbles and the centrifugally separated process waste gas can be dissolved in the washing liquid to obtain a washed gas.

2. The system for separation of gas and solid as claimed in claim 1, wherein the suction force is co-generated by a pump provided between the waste gas treatment device and the cyclone trapping device.

3. The system for separation of gas and solid as claimed in claim 1, further comprising a plasma asher disposed between the gas inlet and outlet chamber and the waste gas treatment device to miniaturize the rest solid particles carried by the centrifugally separated process waste gas and disposed between the gas inlet and outlet chamber and the process waste gas source in order to miniaturize the solid particles carried by the process waste gas.

4. The system for separation of gas and solid as claimed in claim 3, wherein the plasma asher is a low-pressure plasma asher, which is turned on only when the process waste gas is generated by the process waste gas source.

5. The system for separation of gas and solid as claimed in claim 4, wherein a numerical value of the preset value is greater than 0.01 μm.

6. The system for separation of gas and solid as claimed in claim 1, further comprising a plasma asher disposed between the gas inlet and outlet chamber and the waste gas treatment device to miniaturize the rest solid particles carried by the centrifugally separated process waste gas.

7. The system for separation of gas and solid as claimed in claim 1, further comprising a collection tank communicated with the cyclone separation chamber, so as to collect the solid particles in the collection tank through the solid particle collection port.

8. The system for separation of gas and solid as claimed in claim 7, wherein the cyclone separation chamber further has a first on-off valve disposed at the solid particle collection port.

9. The system for separation of gas and solid as claimed in claim 7, wherein the cyclone separation chamber or the collection tank further comprises a discharge tube communicated with a filter component of the waste gas treatment device, so as to discharge the solid particles to the waste gas treatment device.

10. The system for separation of gas and solid as claimed in claim 9, wherein the discharge tube has a second on-off valve.

11. The system for separation of gas and solid as claimed in claim 1, wherein the suction port of the gas outlet tube is movably located on a chamber of the gas inlet and outlet chamber and extends into the inside of the gas inlet and outlet chamber with the distance inversely proportional to a flow rate of the process waste gas.

12. The system for separation of gas and solid as claimed in claim 1, wherein a value of a height of the gas inlet and outlet chamber divided by a value of an inner diameter of the gas inlet and outlet chamber is between 1 and 2, and/or a value of a height of the cyclone separation chamber divided by the value of an inner diameter of the gas inlet and outlet chamber is between 1 and 2.

13. The system for separation of gas and solid as claimed in claim 1, wherein the process waste gas enters the gas inlet and outlet chamber and/or the cyclone separation chamber in a direction parallel to a tangential direction of a chamber of the gas inlet and outlet chamber in order to generate cyclones, and the process waste gas enters the gas inlet and outlet chamber at an angle less than 90 degrees relative to an axial direction of the chamber of the gas inlet and outlet chamber.

14. The system for separation of gas and solid as claimed in claim 1, wherein the cyclone separation chamber is a conical chamber, and the gas inlet and outlet chamber is a cylindrical chamber or a conical chamber.

15. The system for separation of gas and solid as claimed in claim 1, wherein a flow rate of the process waste gas being introduced into the gas inlet and outlet chamber is less than 1,000 SLM.

16. The system for separation of gas and solid as claimed in claim 1, wherein a quantity of the cyclone trapping device is more than one, and the cyclone trapping devices are connected in series and/or in parallel to communicate with one another.

17. The system for separation of gas and solid as claimed in claim 1, wherein a quantity of the cyclone trapping device is more than one, and the gas outlet tube of one of the adjacent cyclone trapping devices is communicated in series with the gas inlet tube of the other adjacent cyclone trapping device.

18. The system for separation of gas and solid as claimed in claim 1, wherein a quantity of the cyclone trapping device is more than one, the gas inlet tube of one of the adjacent cyclone trapping devices is communicated in parallel with the gas inlet tube of the other adjacent cyclone trapping device, and the gas outlet tube of one of the adjacent cyclone trapping devices is communicated in parallel with the gas outlet tube of the other adjacent cyclone trapping device.

* * * * *